United States Patent [19]
Candy et al.

[11] Patent Number: 5,963,886
[45] Date of Patent: Oct. 5, 1999

[54] SELECTIVE MONITORING SYSTEM

[75] Inventors: Richard Brodrick Charles Candy; Anthony Vincent Blake, both of Johannesburg, South Africa

[73] Assignee: Eskom, Gauteng, South Africa

[21] Appl. No.: 08/865,499

[22] Filed: May 29, 1997

[30] Foreign Application Priority Data

May 31, 1996 [ZA] South Africa .......................... 96/4491

[51] Int. Cl.[6] .................................................. G21C 17/00
[52] U.S. Cl. ...................... 702/61; 340/525; 340/286.01; 701/99; 364/188
[58] Field of Search .................................. 364/550, 481, 364/188; 340/525, 517, 524, 825.06, 286.01; 702/61; 345/340, 348; 701/99

[56] References Cited

U.S. PATENT DOCUMENTS

| | | | |
|---|---|---|---|
| 4,403,213 | 9/1983 | Khamare et al. ....................... | 340/525 |
| 4,632,802 | 12/1986 | Herbst et al. ........................... | 376/259 |
| 4,749,985 | 6/1988 | Corsberg ................................. | 340/525 |
| 4,816,208 | 3/1989 | Woods et al. .......................... | 340/525 |
| 5,167,010 | 11/1992 | Elm et al. ............................... | 376/259 |
| 5,414,408 | 5/1995 | Berra ...................................... | 340/525 |

*Primary Examiner*—John Barlow
*Assistant Examiner*—Hien Vo
*Attorney, Agent, or Firm*—Rockey, Milnamow & Katz, Ltd.

[57] ABSTRACT

A system is monitored by an operator choosing a part thereof having a number of items of equipment; determining the values of parameters of components forming the equipment items included in the chosen part of the system; deciding from the values if the parameters are abnormal; determining in which of a plurality of categories each parameter falls and grouping together those parameters that are abnormal in each category for each equipment item; selecting, by an operator, certain types of the equipment items and certain of the categories; and displaying all of the equipment items of the chosen part of the system and all of the categories having abnormal parameters in a graphical manner, with the selected types of equipment items and the selected categories for those selected types of equipment items being displayed in a normal manner and those that have not been selected being "greyed-out". The operator may also select certain operational characteristics, with only those equipment item types having those characteristics being normally displayed and the others also being "greyed-out".

26 Claims, 4 Drawing Sheets

5,963,886

SELECTIVE MONITORING SYSTEM

BACKGROUND OF INVENTION

This invention relates to the monitoring of a system. More particularly, it relates to a method of and an arrangement for monitoring a system. The system may be any type and may, for example, be an electric utility, a ship or craft, a chemical plant, or an amusement park.

SUMMARY OF INVENTION

Such systems have supervisory control and data acquisition arrangements which monitor the amplitude, state or condition of various parameters of equipment and components thereof and display alarm conditions on a display, to be acted on by control staff.

In this specification, the amplitude, condition or state of a parameter will be referred to as the "value" of the parameter.

A parameter is regarded as "abnormal" if its value attains an amplitude greater than or less than a predetermined amount or if its condition or state changes in an undesired way. Correspondingly, a parameter is regarded as "normal" if it has an amplitude less than or greater than the said predetermined amount (as the case may be) or if its condition or state is acceptable.

According to the invention there is provided a method of monitoring a system, which includes choosing a part of the system;

determining the values of a number of parameters of components forming part of equipment included in the chosen part of the system;

deciding from the values if the selected parameters are abnormal;

grouping the parameters in a plurality of different categories;

selecting certain types of the components and certain of the categories; and displaying all of the components of the chosen part of the system and all of the categories having abnormal parameters in a graphical manner, with the selected types of components and categories being displayed in a differentiated manner to those that have not been selected.

The selected types of components and categories may be displayed in a normal way, with the non-selected component types and categories being "greyed-out".

The method may also include summarising the number of abnormal parameters in each category for a predetermined time interval and also diplaying this number in a graphical manner with the appropriate category of abnormal parameters being displayed.

The method may also include selecting certain operating characteristics which are associated with the selected types of components.

The method may also include identifying in a display, which types of components and which operating characteristics are present in the part of the system that has been chosen.

The types of components, the categories and the operating characteristics may be selected by means of a pointing device by picking and acting on appropriate symbols from the display.

The component types, the operating characteristics and the parameter categories may be selected and implemented in terms of a desired paradigm.

Further according to the invention there is provided an arrangement for monitoring a system, which includes a choosing means for choosing a part of the system;

a value determining means for determining the values of a number of parameters of components forming part of equipment included in the chosen part of the system;

an abnormal value deciding means, for deciding from the values if the selected parameters are abnormal;

a grouping means for grouping the parameters in a plurality of different categories;

a selecting means for selecting certain types of the components and certain of the categories, and a display means for displaying all of the components of the chosen part of the system and all of the categories having abnormal parameters in a graphical manner, with the selected types of components and categories being displayed in a differentiated manner to those that have not been selected.

Conveniently, the selected types of components and categories may be displayed in a normal way, with the non-selected component types and categories being "greyed-out".

The categories of parameters may be represented by icons.

The arrangement may also include a summarising means for summarising the number of abnormal parameters in each category for a predetermined time interval, and displaying this number in the appropriate icon.

The various categories may be represented by icons of different colours.

The system may have operating characteristics which are associated with certain types of components, with the selecting means also including the option to select certain operating characteristics. The system may form part of an electric utility and the operating characteristics may be the different voltage levels of the system.

The arrangement may include an identifying means for identifying which types of components and which operating characteristics are present in the part of the system that has been chosen, with the component types and operating characteristics that are present in the chosen part being indicated in a predetermined manner, thereby assisting a user to make a selection. The component types and operating characteristics that are present in the part of the system that has been chosen may be displayed in a normal way and other types of components and operating characteristics which are not present in the chosen part of the system being "greyed-out".

Thus, a particular voltage level may be selected and the components which operate at that voltage level will be displayed in a normal way and the components that operate at a different level are "greyed-out".

The arrangement may include one or more central processing units for implementing the choosing means, the abnormal value deciding means, the grouping means and the selecting means in a software manner.

The arrangement may be interactive. Th selecting means may include a pointing device which is used for picking and acting on appropriate symbols representing the component types, the operating characteristics and the categories.

The selecting means may include a selection procedure whereby the component types, the operating characteristics and the categories are selected and implemented in terms of a desired paradigm. Thus, the selection procedure may include a "select to include" paradigm or a "select to exclude" paradigm.

In terms of the "select to include" paradigm, initially nothing is selected and when an appropriate control button is activated everything is "greyed-out" and the component types, the operating characteristics and the categories are only displayed after being selected.

In terms of the "select to exclude" paradigm, initially all of the components types, operating characteristics and categories are displayed in a normal way and only when an appropriate control button is activated and the desired component types, the operating characteristics and the categories are selected, are the unwanted portions of the display "greyed-out".

The arrangement may also operate in a progressive or triggered mode. In the progressive mode, the selected component types, the operating characteristics and the categories may be selected and varied at any time. In the triggered mode, the component types, the operating characteristics and the categories may only be selected and varied together by means of the control button.

It will be appreciated that, if a particular component type is selected, only that component type will be displayed in a normal way, with all other component types being displayed "greyed-out". If an operating characteristic is selected, all the components which operate with that characteristic will be displayed in a normal way with all those components that operate with a different characteristic being "greyed-out". If both a component type and an operating characteristic are selected, an AND operation is performed and only those components of the selected type and with the selected operating characteristic will be displayed in a normal way. If multiple component types and operating characteristics are selected, each component type will be ANDed with each operating characteristic and all combinations will be ORed together to form a complete inclusive set. Further, if certain parameter categories are selected, then only the icons for the selected categories for those components in the set will be displayed in a normal manner.

Those skilled in the art will appreciate that data values of the abnormal parameters may also be displayed.

The invention is now described, by way of an example, with reference to the accompanying drawings, in which:

DETAILED DESCRIPTION OF THE DRAWINGS

Figure 1:
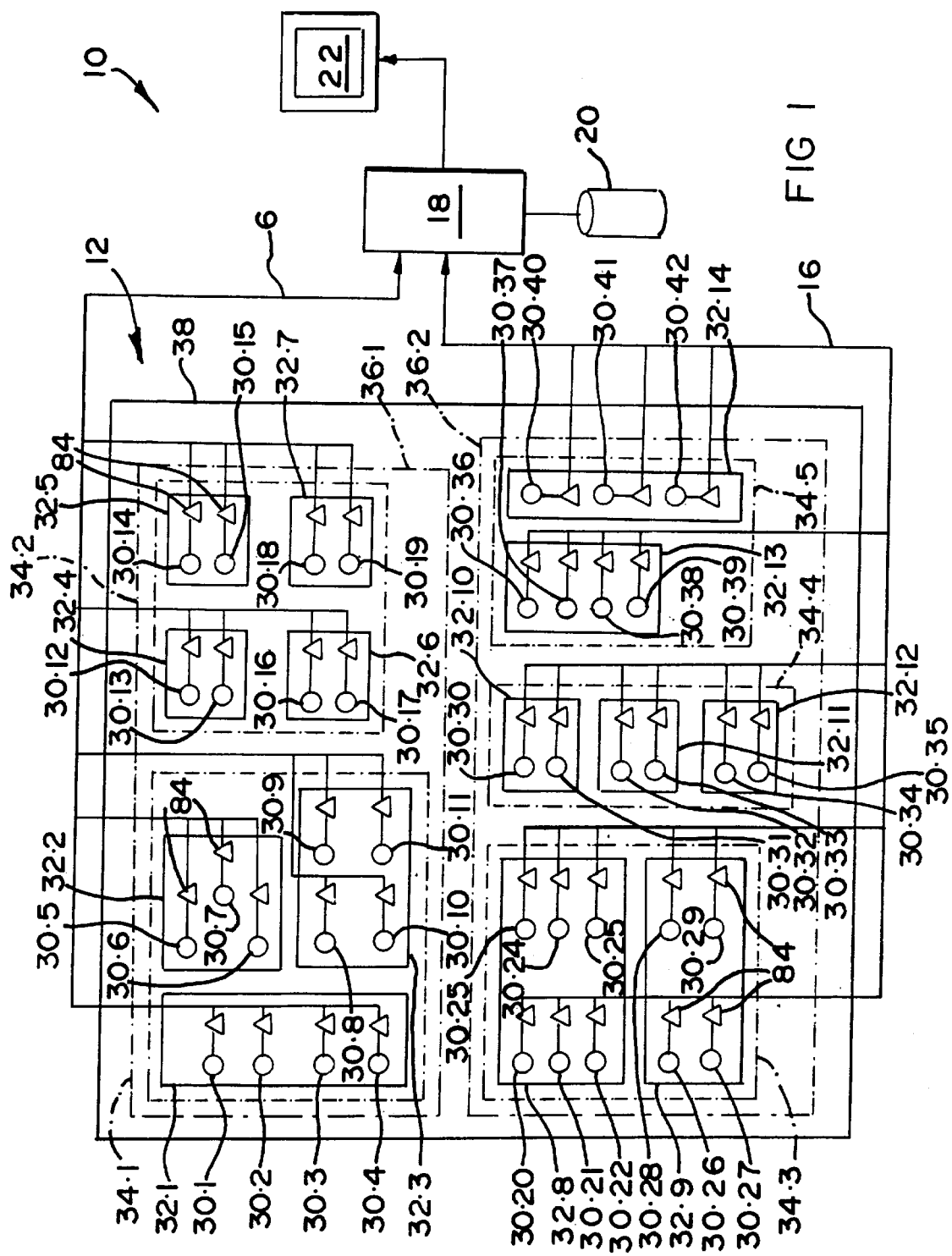
FIG. 1 shows schematically, an electric utility with a monitoring arrangement in accordance with the invention, for monitoring the operation thereof.

Referring to FIG. 1, a monitoring arrangement according to the invention is designated generally by reference numeral 10. The arragement 10 monitors the operation of a system 12 which is an electric utility. The utility comprises a network 38 which is divided into regions 36.1 and 36.2. The region 36.1 has stations 34.1 and 34.2 and the region 36.2 has stations 34.3, 34.4 and 34.5. The station 34.1 has objects 32.1, 32.2, and 32.3; the station 34.2 has objects 32.4, 32.5, 32.6 and 32.7; the station 34.3 has objects 32.8 and 32.9; the station 34.4 has objects 32.10, 32.11 and 32.12; and the station 34.5 has objects 32.13 and 32.14. The object 32.1, in turn, is made up of devices 30.1, 30.2, 30.3 and 30.4; the object 32.2 is made up of devices 30.5, 30.6 and 30.7; the object 32.3 is made up of devices 30.8, 30.9, 30.10 and 30.11; the object 32.4 is made up of devices 30.12 and 30.13; the object 32.5 is made up of devices 30.14 and 30.15; the object 32.6 is made up of devices 30.15, 30.16 and 30.17; the object 32.7 is made up of devices 30.18 and 30.19; the object 32.8 is made up of devices 30.20, 30.21, 30.22, 30.23, 30.24 and 30.25; the object 32.9 is made up of devices 30.26, 30.27, 30.28 and 30.29; the object 32.10 is made up of devices 30.30 and 30.31; the object 32.11 is made up of devices 30.32 and 30.33; the object 32.12 is made up of devices 30.34 and 30.35; the object 32.13 is made up of devices 30.36, 30.37, 30.38 and 30.39; and the object 32.14 is made up of devices 30.40, 30.41 and 30.42.

Each device 30.1 to 30.42 is monitored by its own monitor 14, in a known manner. The monitors 14 monitor various parameters of the devices 30 and supply appropriate signals, again in known manner, via a transmission means 16, to a central computer 18. This computer 18 processes the signals that it receives and determines when any signal attains an abnormal value. If any parameter for any device 30 does acquire an abnormal value, the parameter, its value, the device and the time are stored in a memory unit 20 to create a database. Further, the various parameters are divided into different categories, being health, main protection, backup protection and information. The number of parameters in each category for each device that acquire an abnormal value are summed and also stored in the memory unit 20.

The various categories are upwardly summed, as explained below, for each category, for each object 32, each station 34, each region 36 and the network 38 as a whole; and stored in the memory unit 20. Still further, as explained below, the computer 18 generates and supplies appropriate signals to a display unit 22 which provides a display 60 such as that shown in FIG. 4.

In order to explain the pyramidal structure further, the grouping of an electric utility is explained as follows:

At the lowest level are the individual devices 30 that form the system, such as breakers, transformers and isolators.

When the devices 30 are grouped together they form the electrical objects 32 such as feeder bays, busbars, reactor bays, capacitor bays, transformer bays, etc.

Grouping the objects 32 together creates the substations or power generating stations 34.

Grouping the stations 34 together forms the region 36 of the network 38.

Grouping the regions 36 together forms the network 38.

In regard to the categories, as indicated above, they relate to the health of the devices 30, main protection, backup protection and information. Thus, any parameter which indicates that a condition exists on or associated with the device 30 that could prevent it being reinstated safely is classed in the health category. A parameter which is associated with primary protection and which indicates that primary protection has activated is classed in the main protection category. A parameter associated with secondary protection is classed in the backup protection category. Any other non-operation-critical information is classed in the information category.

The number of abnormal conditions may be upwardly summed.

Figure 2:
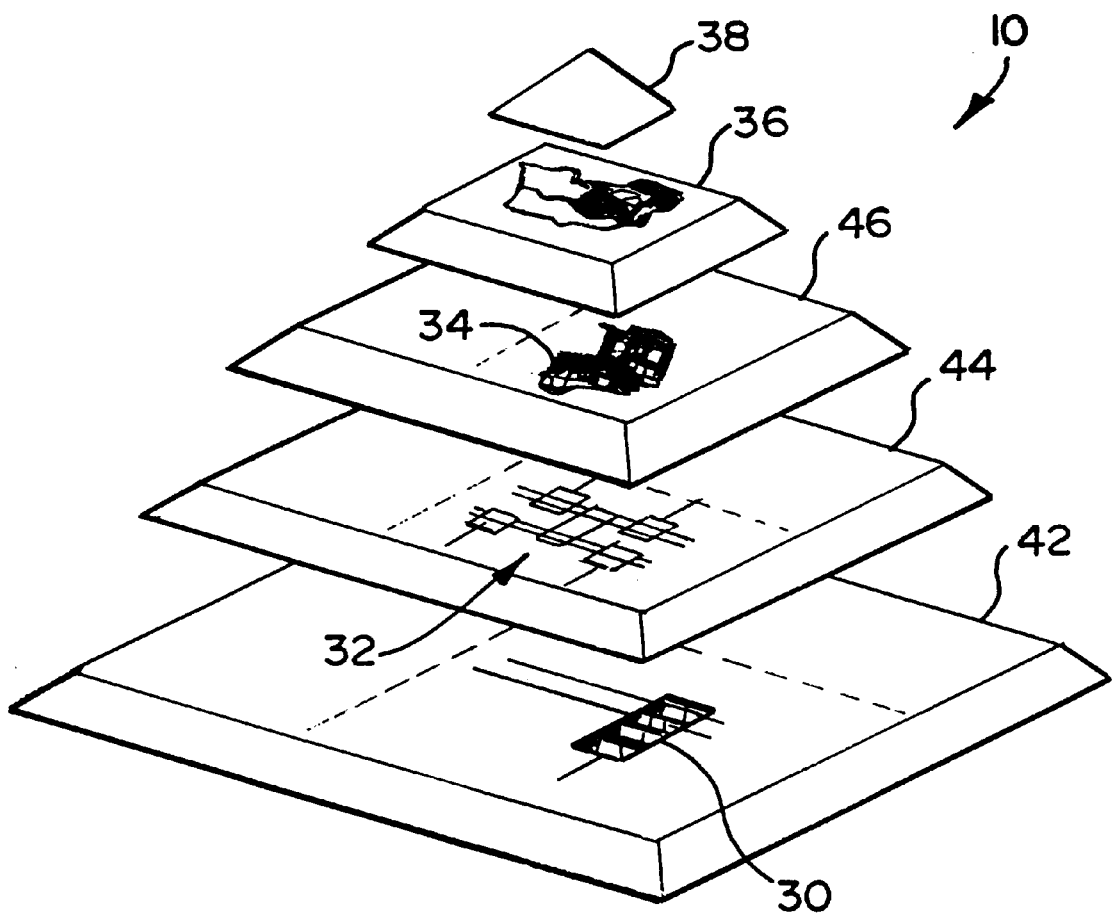
FIG. 2 shows schematically the pyramidal structure of the electric utility.

Referring now to FIG. 2, the pyramidal structure of the electric utility is shown. The structure denotes the utility in a notional representative form. It will be seen that the structure has five levels. A bottom-most, device level 42 represents the individual devices 30 which make up the electric utility. The second level 44 is representative of the electrical objects 32. The next level 46 represents the stations 34. Grouping the stations 34 together provides the regions 36. Finally, the upper-most level is the network 38.

As indicated above, various parameters associated with each device (and which vary from one device type to another) are monitored. Also, as indicated above, the parameters are divided into four categories—Health, Main protection, Backup protection and Information. Various parameters for various devices, and the category in which they are allocated are as follows:

1. GENERATOR
   HEALTH CATEGORY

| | |
   |---|---|
   | General alarm | Alarm/normal |
   | Emergency shutdown | Progress/inactive |
   | Generator start | Not ready/idle |
   | Synchronised start | Not ready/idle |

INFORMATION CATEGORY

| | |
   |---|---|
   | Emergency trip | On/off |
   | Remote control | |
   | Sequence start | Auto/remote |
   | Shutdown | Yes/no |
   | Status | Start/normal |
   | Guide vane mode | Auto/manual |

2. TRANSFORMER
   HEALTH

| | |
   |---|---|
   | SF6 non-urgent | Alarm/normal |
   | SF6 urgent | Alarm/normal |
   | Scald supervisory | Alarm/normal |
   | DC supervision | Alarm/normal |
   | Fire | Alarm/normal |
   | Bus Zone DC | Fail/normal |

MAIN

| | |
   |---|---|
   | Bus strip | Operated/normal |
   | Bus zone | Operated/normal |
   | Auto U/F control | Failed/normal |

INFORMATION

| | |
   |---|---|
   | Maximum generation | Selected/off |
   | Emergency generation | Selected/off |
   | Maximum Generation | Reset/initiated |
   | Emergency generation | Reset/initiated |

3. A DAM
   HEALTH

| | |
   |---|---|
   | Low water level | Trip/normal |

BACKUP

| | |
   |---|---|
   | Supply dam #1 level | Trip/normal |
   | Supply dam #2 level | Trip/normal |

INFORMATION

| | |
   |---|---|
   | High water | Trip/normal |

The manner in which the parameters are monitored are well known to persons skilled in the control of electric utilities and do not form any part of this invention.

Figure 3:
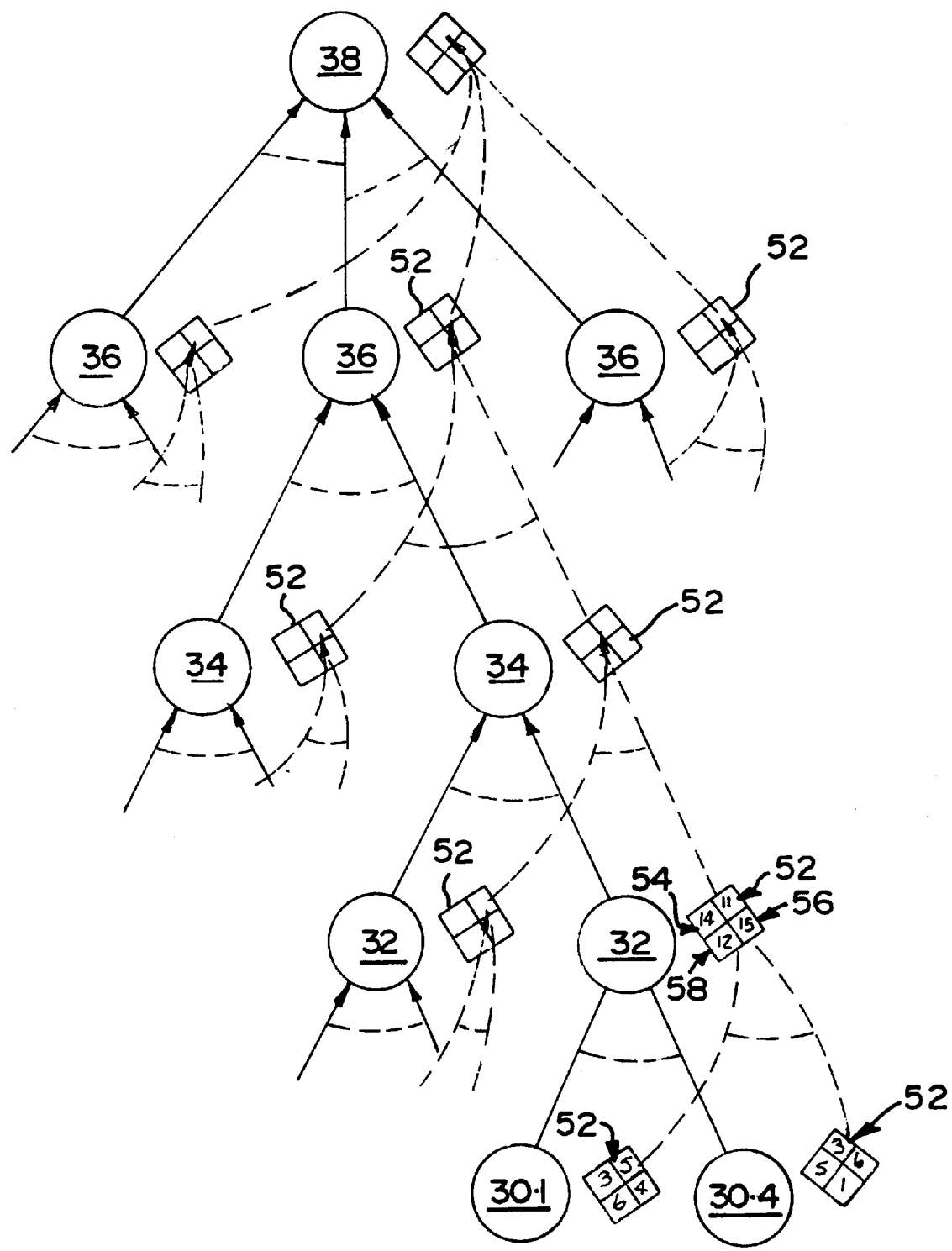
FIG. 3 shows schematically an upward summing procedure utilised with the structure.

The manner in which the parameters are upwardly summed is illustrated in FIG. 3 using "diamond-shaped" icons 52 to indicated each category. Thus, the parameters for all the devices 30 in the system are monitored and when any parameter attains an abnormal value the number for the category in question is increased by one. Similarly, if a particular parameter had an abnormal value which then reverted to a normal value, then the number in the category in question for the device in question is decreased by one.

As indicated above, there are a number of objects 32 in the object level. Each object 32 is made up of one or more of the devices 30. The number of abnormal parameters in each category for each device 30 associated with a particular object are summed to provide a number for the category in question for the object 32 in question. Thus, for example, if a particular object 32 is made up of four devices 30.1, 30.2, 30.3 and 30.4 and these devices have the following numbers of abnormal parameters in the four categories:

| | Number of abnormal parameters in health category | Number of abnormal parameters in main protection category | Number of abnormal parameters in backup protection category | Number of abnormal parameters in information category |
|---|---|---|---|---|
| Device 30.1 | 5 | 3 | 4 | 6 |
| Device 30.2 | 2 | 4 | 5 | 2 |
| Device 30.3 | 1 | 2 | 0 | 3 |
| Device 30.4 | 3 | 5 | 6 | 1 |
| Total for object 32 | 11 | 14 | 15 | 12 |

Thus, at the object level, the object 32 will have icons 52, 54, 56 and 58 for each category with the numbers "11", "14", "15" and "12" respectively, therein. As shown, the icons are diamond-shaped.

Similarly, at the station level there are a number of stations 34, each station being formed from one or more of the objects 32 in the object level. Again, the number of abnormal parameters in each category for each object 32 forming a particular station 34 are summed to provide the number of abnormal parameters in each category for that station.

This process is repeated further upwardly to provide the number of abnormal parameters in each category for each region 36 at the region level and then for the network 38 itself, at the very top of the pyramidal structure.

Figure 4:
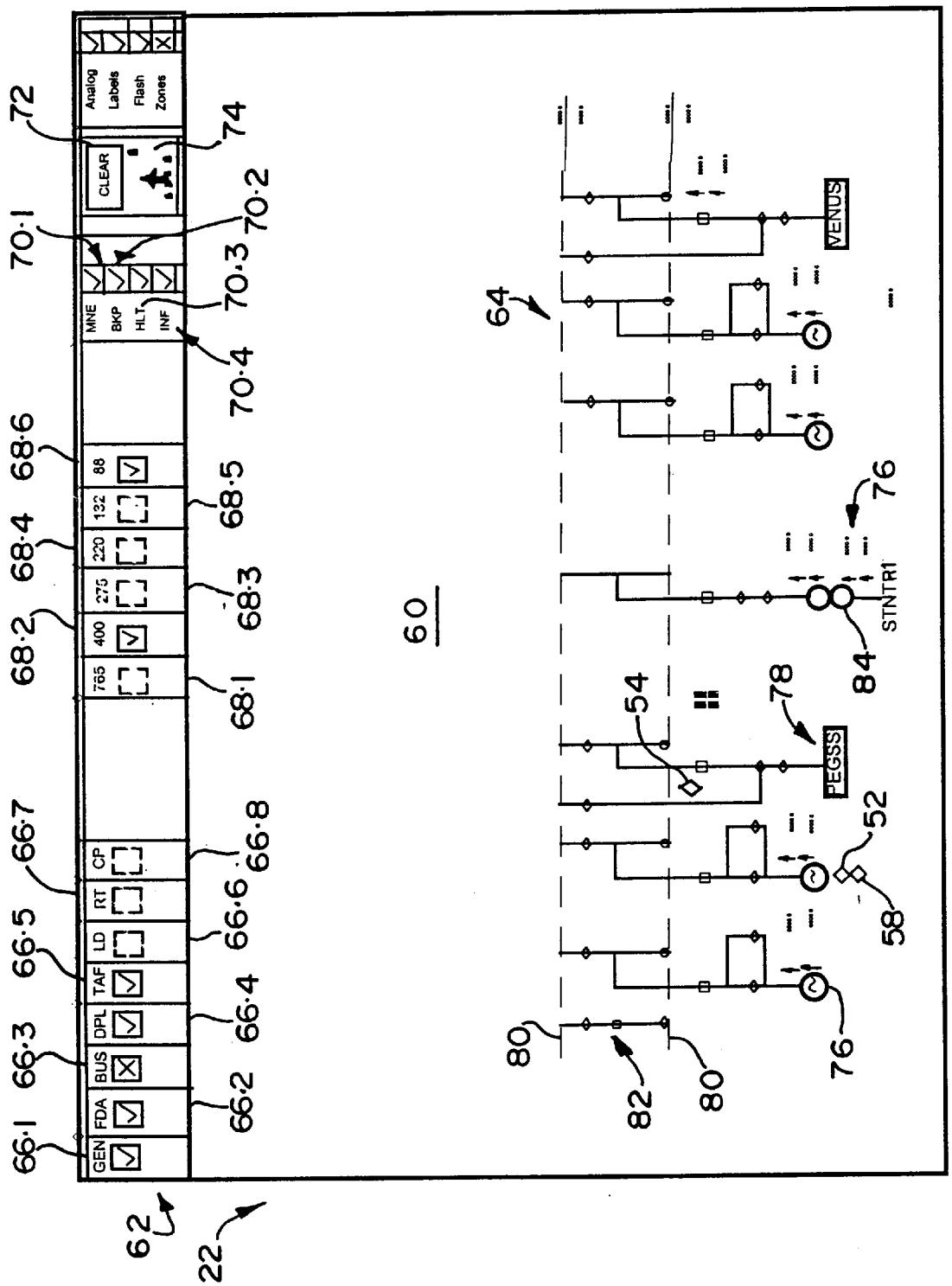
FIG. 4 shows a display that is provided by the arrangement.

Referring now to FIG. 4, an example of a display that is provided is designated generally by reference numeral 22. The display 22 has two windows, a main work area 60 and a filtering control panel 62. A graphical representation of a chosen part of the system is displayed in the work area 60. In the figure, a sub-station 64 is shown. The various components, or objects 32 comprising the sub-station are represented in known manner.

The statuses of the various objects 32, as determined by the parameters of each object are indicated by icons 52, 54, 56 and 58 which are (as discussed above) diamond-shaped with the different categories being indicated by icons of different colours. Thus, the main protection category is designated by a cyan icon; the back-up protection category by a green icon, the health category by a yellow icon; and the information category by a magenta icon.

In the control panel 62, there are three groups of symbols 66, 68 and 70. The symbols 66 are for different types of components, the symbols 68 are for different voltage levels, and the symbols 70 are for the different categories of parameters. Thus, there are symbols 66 for the following types of components: generator 66.1; feeder 66.2; bus 66.3; coupler 66.4; transformer 66.5; load 66.6; reactor 66.7 and capacitor 66.8. Similarly, there are symbols 68 for the various voltage levels as follows. 765 KV—68.1; 400 KV—68.2; 275 KV—68.3; 220 KV—68.4; 132 KV—68.5 and 88 KV—68.6. Similarly, there are four symbols 70 for the categories of parameters, viz; main category 70.1; backup category 70.2; health category 70.3; and information category 70.4.

Further, in the control panel 62 there are a clear button 72 and a filter button 74. If the filter button 74 is activated, then symbols 66, 68 and 70 that have been selected are given effect and appropriate portions of the graphical representation 64 in the work area 60 greyed out as is explained below. Activation of the clear button 72 removes the greying out and resets the procedure.

As shown in the representation 64, there are generators 76, feeders 78, busses 80, couplers 82 and transformers 84. There are no loads, reactors or capacitors in the sub-station displayed in the work area 60. Thus, the symbols 66.1 to 66.5 are normally displayed, whereas the symbols 66.6, 66.7 and 66.8 are greyed out. Similarly, the sub-station has 400 KV and 88 KV voltage levels. Thus, the symbols 68.2 and 68.6 are normally displayed, with the symbols 68.1, 68.3, 68.4 and 68.5 being greyed out.

Data is also displayed, as indicated at 76.

As indicated by ticks in the blocks associated with the symbols 66, the symbols 66.1, 66.2, 66.4 and 66.5 have been selected. Thus, the graphical representations for the generators 76, feeders 78, couplers 82 and transformers 84 are shown normally. As the symbol 66.3 has been rejected, as indicated by a cross in the relevant block, the busses 80 are shown in a greyed out way. As both possible voltage levels have been selected, there are ticks in the boxes associated with symbols 68.2 and 68.4. Further, as all four parameter categories have been selected, there are ticks in the four boxes associated with the symbols 70. As all four parameter categories have been selected, icons for all the categories will be indicated for all the objects, except the busses, as there have been rejected. Thus, the icons 52, 54 and 58 are displayed. No icon 56 is displayed as none of the selected objects has an abnormal backup parameter. It will be appreciated that the symbols 66, 68 and 70 are selected by a control operator.

In use, the operator will choose which part of the system to display in the work area 60 and give an appropriate instruction. The computer 18 will provide the appropriate signals and the appropriate graphical representation will be displayed. Depending on the part of the system that has been chosen, the relevant symbols 66 and 68 will be greyed out. The operator then selects which symbols 66, 68 and 70 he wants and activates them by means of the pointing device and activates the filter button 74. The computer then greys out the relevant portions of the representation. If the operator wishes to change his selection, he activates the clear button 72 by means of the pointing device.

It will accordingly be appreciated that the operator can easily and quickly monitor and understand the condition or state of the utility network or any particular component thereof.

We claim:

1. A method of monitoring a system, which includes choosing a part of the system having a number of equipment items;
   determining the values of a number of parameters of components forming the equipment items included in the chosen part of the system, each parameter being allocated to one of a plurality of categories;
   deciding from the values if the said parameters are abnormal;
   grouping together those parameters that are abnormal in each category for each equipment item;
   selecting, by an operator, certain types of the equipment items and certain of the categories; and
   displaying all of the equipment items of the chosen part of the system and all of the categories having abnormal parameters in a graphical manner, with the selected types of equipment items and the selected categories for those selected types of equipment items being displayed in a differentiated manner to those that have not been selected.

2. The method as claimed in claim 1, wherein the selected types of equipment items and categories are displayed in a normal way, with the non-selected equipment item types and categories being "greyed-out".

3. The method as claimed in claim 1, which includes summing the number of abnormal parameters in each category for each equipment item and also displaying this number with each category that has abnormal parameters.

4. The method as claimed in claim 1, which includes selecting, by the operator, certain operating characteristics which are associated with the selected types of equipment items.

5. The method as claimed in claim 4, which includes identifying in a display which types of equipment items and which operating characteristics are present in the part of the system that has been chosen.

6. The method as claimed in claim 5, wherein the types of equipment items, the categories and the operating characteristics are selected by means of a pointing device by picking and acting on appropriate symbols from the display.

7. The method as claimed in claim 6, wherein the equipment item types, the operating characteristics and the categories are selected and implemented in terms of a desired paradigm.

8. An arrangement for monitoring a system, which includes
   a choosing means for choosing a part of the system having a number of equipment items;
   a value determining means for determining the values of a number of parameters of components forming part of the equipment items included in the chosen part of the system, each parameter being allocated to one of a plurality of categories;
   an abnormal value deciding means, for deciding from the values if the said parameters are abnormal;
   a category grouping means for grouping together those parameters that are abnormal in each category for each equipment item;
   a selecting means, that is operable by an operator, for selecting certain types of the equipment items and certain of the categories; and
   a display means for displaying all of the equipment items of the chosen part of the system and all of the categories having abnormal parameters in a graphical manner, with the selected types of equipment items and the selected categories for those selected types of equipment items being displayed in a differentiated manner to those that have not been selected.

9. The arrangement as claimed in claim 8, wherein the selected types of equipment items and categories are displayed in a normal way, with the non-selected equipment item types and categories being "greyed-out".

10. The arrangement as claimed in claim 9, wherein the categories are represented by icons.

11. The arrangement as claimed in claim 10, which includes a summing means for summing the number of abnormal parameters in each category, and displaying this number in the appropriate icon.

12. The arrangement as claimed in claim 10, wherein the various categories are represented by icons of different colours.

13. The arrangement as claimed in claim 8, wherein the system has operating characteristics which are associated with certain types of equipment items, with the selecting means also being operable to select certain operating characteristics.

14. The arrangement as claimed in claim 13, wherein the system forms part of an electric utility and the operating characteristics are the different voltage levels of the system.

15. The arrangement as claimed in claim 8, which includes an identifying means for identifying which types of equipment items and which operating characteristics are present in the part of the system that has been chosen, with the equipment item types and operating characteristics that are present in the chosen part being indicated in a predetermined manner, thereby assisting the operator to make a selection.

16. The arrangement as claimed in claim 15, wherein the equipment item types and operating characteristics that are present in the part of the system that has been chosen are displayed in a normal way and the other types of equipment items and operating characteristics which are not present in the chosen part of the system being "greyed-out".

17. The arrangement as claimed in claim 8, which includes a central processing unit for implementing the choosing means, the abnormal value deciding means, the category grouping means and the selecting means in a software manner.

18. The arrangement as claimed in claim 8, wherein the selecting means includes a pointing device which is used for picking and acting on appropriate symbols representing the equipment item types, the operating characteristics and the categories.

19. The arrangement as claimed in claim 18, wherein the selecting means includes a selection procedure whereby the equipment item types, the operating characteristics and the categories are selected and implemented in terms of a desired paradigm.

20. The arrangement as claimed in claim 19, wherein the selection procedure includes a "select to include" paradigm, in terms of which initially, nothing is selected and when an appropriate control button is activated, everything is "greyed-out" and the equipment item types, the operating characteristics and the categories are only displayed after being selected.

21. The arrangement as claimed in claim 19, wherein the selection procedure includes a "select to exclude" paradigm in terms of which, initially all of the equipment item types, operating characteristics and categories are displayed in a normal way and only when an appropriate control button is activated and the desired equipment item types, the operating characteristics and the categories are selected, are the unwanted portions of the display "greyed-out".

22. The arrangement as claimed in claim 19, which operates in a progressive mode, wherein the selected equipment item types, the operating characteristics and the categories are selected and varied at any time.

23. The arrangement as claimed in claim 21, which is operated in a triggered mode, wherein the equipment item types, the operating characteristics and the categories are selected and varied together by means of the control button.

24. The arrangement as claimed in claim 8 wherein data values of the abnormal parameters are also displayed.

25. The method as claimed in claim 1, in which the said part of the system is chosen by the operator.

26. The arrangement of claim 8, wherein the choosing means is operator operable.

* * * * *